US009519825B2

(12) United States Patent
Gao et al.

(10) Patent No.: US 9,519,825 B2
(45) Date of Patent: Dec. 13, 2016

(54) DETERMINING ACCESS PERMISSION

(71) Applicant: International Business Machines Corporation, Armonk, NY (US)

(72) Inventors: Jin Sheng Gao, Beijing (CN); Jin Jun Su, Beijing (CN); Rong Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/674,092

(22) Filed: Mar. 31, 2015

(65) Prior Publication Data

US 2016/0292493 A1 Oct. 6, 2016

(51) Int. Cl.
  *G06K 9/62* (2006.01)
  *G06K 9/00* (2006.01)
  *G06F 21/32* (2013.01)

(52) U.S. Cl.
  CPC ........... *G06K 9/00221* (2013.01); *G06F 21/32* (2013.01); *G06K 9/6202* (2013.01)

(58) Field of Classification Search
  CPC .................................. G06K 9/00221–9/00295
  See application file for complete search history.

(56) References Cited

U.S. PATENT DOCUMENTS

| 2007/0126873 | A1 | 6/2007 | Xu et al. |
| 2013/0039590 | A1 | 2/2013 | Yoshio |
| 2014/0015967 | A1 | 1/2014 | Moore et al. |
| 2014/0071273 | A1 | 3/2014 | Balthasar et al. |
| 2015/0074206 | A1* | 3/2015 | Baldwin ............... H04L 51/10 709/206 |

FOREIGN PATENT DOCUMENTS

WO 2014101220 A1 7/2014

* cited by examiner

*Primary Examiner* — Brian P Werner
(74) *Attorney, Agent, or Firm* — Jay Wahlquist

(57) ABSTRACT

An access permission level for a first individual may be calculated by utilizing repositories of social network databases. The facial image of a first individual may be captured and compared with a repository of pre-categorized individuals. In response to the facial image of the first individual being absent from the repository of pre-categorized individuals, the repositories of social network databases may be crawled to collect facial images of non-categorized individuals. The first facial image may be compared with the facial images of non-categorized individuals, and a second individual may be identified. In response to identifying, categorization data associated with the second individual may be collected. Utilizing the categorization data, the second individual may be sorted into one of a plurality of categories. Based upon an image match score and the category which the second individual is sorted into, an access permission level may be determined and provided to a user.

18 Claims, 8 Drawing Sheets

| CATEGORY | IMAGE MATCH SCORE 412 | CATEGORY CONSTANT 414 | ID VALUE 416 | THRESHOLD 1 418 | THRESHOLD 2 420 | THRESHOLD 3 422 |
|---|---|---|---|---|---|---|
| FAMILY 406 | | | | | | |
| FRIENDS OF FAMILY 408 | | | | | | |
| UNKNOWN 410 | | | | | | |

FIG. 4

| CATEGORY | IMAGE MATCH SCORE 504 | CATEGORY CONSTANT 506 | ID VALUE 508 | THRESHOLD 1 510 | THRESHOLD 2 512 | THRESHOLD 3 514 |
|---|---|---|---|---|---|---|
| FAMILY 502 | 0.5 | 2.5 | 1.25 | $0 < IV < 1$ | $1 < IV < 2$ | $IV > 2$ |

FIG. 5

DETERMINING ACCESS PERMISSION

BACKGROUND

The present disclosure relates generally to observation of a specific location, and more particularly, to determining access permission. In recent years, burglary, fraud and other crimes have frequently occurred as a result of an individual posing as someone they are not. In the context of home security, ascertaining the true identity of an individual requesting access permission can be challenging, especially for the young and the elderly. Accordingly, there is a need to be able to quickly and decisively determine who the individual requesting access permission is.

SUMMARY

Aspects of the present disclosure may include a computer-implemented method for utilizing repositories of social network databases for calculating an access permission level for a first individual. The method can include receiving a first facial image of a first individual. The facial image of the first individual may be captured through a monitoring device at a computerized locking mechanism. In response to receiving the first facial image, the first facial image may be compared with the facial images of pre-categorized individuals stored in a repository of pre-categorized individuals. In embodiments, storing the facial images of the pre-categorized individuals may include sorting each pre-categorized individual into a category within a group of categories. In certain embodiments, the categories may include at least a first category, a second category, and a third category. In response to the first facial image being absent from the repository of pre-categorized individuals, the first facial image may be compared with facial images of non-categorized individuals stored in a repository of non-categorized individuals. In certain embodiments, comparing the first facial image with facial images stored in the repository of non-categorized individuals may include crawling the repositories of social network databases to collect facial images of non-categorized individuals. Based upon comparing the first facial image with facial images stored in the repository of non-categorized individuals, a facial image of a second individual may be identified. In certain embodiments, identifying a facial image of a second individual may include identifying a facial image of a second individual which results in an image match score with the first facial image that is above an image match threshold.

In response to identifying, categorization data associated with the second individual may be collected from the repositories of social network databases. Based upon the collected categorization data, the second individual may be sorted into one of the categories. Utilizing the image match score of the second individual and the category which the second individual was sorted into, an access permission level for the first individual may be determined. In response to determining the access permission level, the access permission level may be provided.

Aspects of the present disclosure may include a computer program product for utilizing repositories of social network databases for calculating an access permission level for a first individual. The computer program product can include receiving a first facial image of a first individual. The facial image of the first individual may be captured through a monitoring device at a computerized locking mechanism. In response to receiving the first facial image, the first facial image may be compared with the facial images of pre-categorized individuals stored in a repository of pre-categorized individuals. In embodiments, storing the facial images of the pre-categorized individuals may include sorting each pre-categorized individual into a category within a group of categories. In certain embodiments, the categories may include at least a first category, a second category, and a third category. In response to the first facial image being absent from the repository of pre-categorized individuals, the first facial image may be compared with facial images of non-categorized individuals stored in a repository of non-categorized individuals. In certain embodiments, comparing the first facial image with facial images stored in the repository of non-categorized individuals may include crawling the repositories of social network databases to collect facial images of non-categorized individuals. Based upon comparing the first facial image with facial imagers stored in the repository of non-categorized individuals, a facial image of a second individual may be identified. In certain embodiments, identifying a facial image of a second individual may include identifying a facial image of a second individual which results in an image match score with the first facial image that is above an image match threshold.

In response to identifying, categorization data associated with the second individual may be collected from the repositories of social network databases. Based upon the collected categorization data, the second individual may be sorted into one of the categories. Utilizing the image match score of the second individual and the category which the second individual was sorted into, an access permission level for the first individual may be determined. In response to determining the access permission level, the access permission level may be provided.

Aspects of the present disclosure may include a computer-implemented system for utilizing repositories of social network databases for calculating an access permission level for a first individual. The computer-implemented system can include receiving a first facial image of a first individual. The facial image of the first individual may be captured through a monitoring device at a computerized locking mechanism. In response to receiving the first facial image, the first facial image may be compared with the facial images of pre-categorized individuals stored in a repository of pre-categorized individuals. In embodiments, storing the facial images of the pre-categorized individuals may include sorting each pre-categorized individual into a category within a group of categories. In certain embodiments, the categories may include at least a first category, a second category, and a third category. In response to the first facial image being absent from the repository of pre-categorized individuals, the first facial image may be compared with facial images of non-categorized individuals stored in a repository of non-categorized individuals. In certain embodiments, comparing the first facial image with facial images stored in the repository of non-categorized individuals may include crawling the repositories of social network databases to collect facial images of non-categorized individuals. Based upon comparing the first facial image with facial images stored in the repository of non-categorized individuals, a facial image of a second individual may be identified. In certain embodiments, identifying a facial image of a second individual may include identifying a facial image of a second individual which results in an image match score with the first facial image that is above an image match threshold.

In response to identifying, categorization data associated with the second individual may be collected from the repositories of social network databases. Based upon the collected categorization data, the second individual may be sorted into one of the categories. Utilizing the image match score of the second individual and the category which the second individual was sorted into, an access permission level for the first individual may be determined. In response to determining the access permission level, the access permission level may be provided.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4 illustrates an identification value matrix, according to embodiments.

FIG. 5 illustrates an example implementation of an identification value matrix, according to embodiments.

Figure 1:
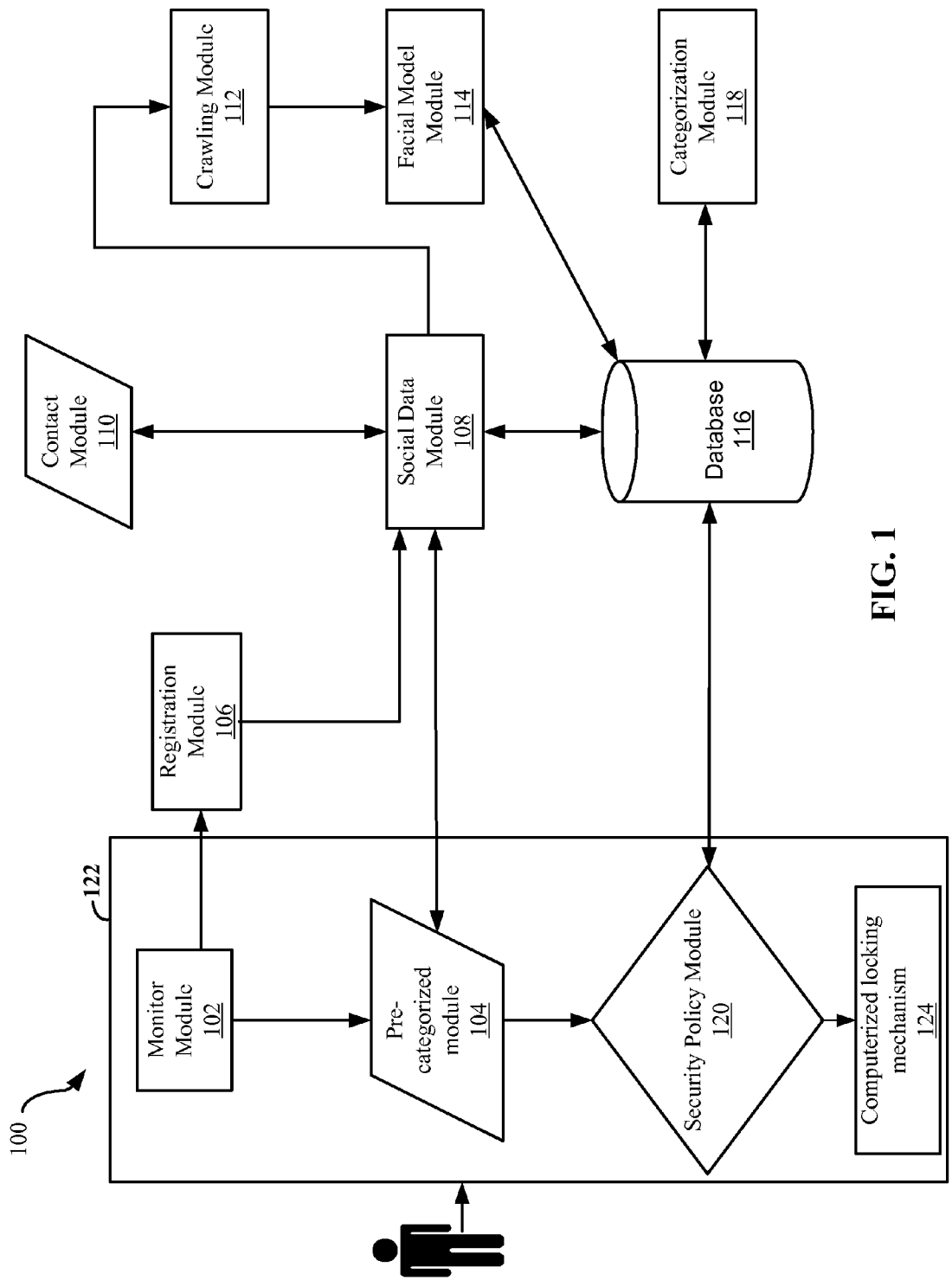
FIG. 1 depicts a high level block diagram of a system for utilizing repositories of social network databases for calculating an access permission level, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure include a computer-implemented method, system, and computer program product for utilizing repositories of social network databases for calculating an access permission level. The computer-implemented method may allow a user, utilizing repositories of social network databases, to identify a visitor requesting access to a building. The computer-implemented method may capture, using a monitoring device, the facial image of the visitor and may compare the captured facial image with facial images of pre-categorized individuals. If the computer-implemented method fails to locate the facial image of the visitor within the facial images of pre-categorized individuals, the computer-implemented method may compare the facial image of the visitor with facial images of non-categorized individuals stored in a repository of non-categorized individuals. The facial images of non-categorized individuals may be compared with the captured facial image of the visitor. In certain embodiments, comparing the facial image of the visitor with facial images of non-categorized individuals may include crawling the repositories of social network databases to collect facial images of non-categorized individuals.

Based upon comparing the captured facial image with the facial images of non-categorized individuals, a second individual may be identified. In embodiments, a second individual may be identified if the facial image of the second individual and the facial image of the visitor result in an image match score outside of an image match threshold. Categorization data associated with the second individual may be collected from the repositories of social network databases, and the categorization data may be used to sort the second individual into one of three categories. Based upon the image match score and the category which the second individual is sorted into, an access permission level may be calculated and displayed to a user through the monitoring device. While the present disclosure is not necessarily limited to such applications, various aspects of the disclosure may be appreciated through a discussion of various examples using this context.

Various embodiments of the present disclosure are directed towards facilitating recognition of individuals requesting entrance to a building or secure location (e.g., a work yard). In the context of home security, burglary, fraud and other crimes frequently occur when individuals trying to get inside a home pose as someone they are not. Older family members and young children are particularly susceptible to these types of crimes because they may lack the intelligence, strength, or energy to protect themselves. Although many housing complexes and private homes utilize security systems, such as a visual intercom monitor, the inhabitants of a home may have difficulty determining if an individual standing at the door is actually a family member, a friend or a dangerous criminal.

In embodiments, a facial image of a visitor may be captured through a monitoring device at a computerized locking mechanism. A facial image of a visitor may include the front part of the head of a person from the forehead to the chin. The computerized locking mechanism may be attached to a door or similar means providing access to a building. In embodiments, the computerized locking mechanism may communicate with and be connected to the monitoring device via a network. The computerized locking mechanism may operate according to access permission levels, discussed in further detail herein. A monitoring device may include a motion sensor or a camera. In various embodiments, a monitoring device may be connected to a personal computer via a network. The personal computer may include a monitor to display facial images to a user through a graphical user interface. In response to receiving the facial image of a visitor captured through the monitoring device, the captured facial image may be compared with facial images of pre-categorized individuals. Pre-categorized individuals may include previous visitors to the building or individuals previously registered by a user. The pre-categorized individuals may have been sorted into a category within a group of categories including at least a first category, a second category, and a third category. In certain embodiments, the first category may include family members of a user, the second category may include friends of family members of a user, and the third category may include individuals unidentified by the user or unknown to the user. In various embodiments, the third category may include individuals who are dangerous or have been previously registered by a user to automatically deny access.

Based upon comparing the captured facial image to the facial images of the pre-categorized individuals, the computer-implemented method may fail to locate a facial image that results in an image match score outside of an image match threshold. Comparing the captured facial image to the facial images of the pre-categorized individuals may include determining an image match score. An image match score may be a numerical value representing a percentage that two facial images are identical. Failing to locate a facial image may include comparing the facial image of the visitor with facial images within the first category, the second category, and the third category. An image match threshold may be a predetermined numerical value representing a minimum image match score required to define an access permission level. In embodiments, an image match threshold may be user-defined. An access permission level may a visual indication of a tier in a multi-tiered system defining entry privileges.

In response to failing to locate a facial image within the repository of pre-categorized individuals that is outside of an image match threshold, the computer-implemented method may compare the facial image of the visitor with facial images of non-categorized individuals stored in a repository of non-categorized individuals. In certain embodiments, comparing the facial image of the visitor with facial images of non-categorized individual stored in the repository of non-categorized individuals may include crawling the repositories of social network databases to collect facial images of non-categorized individuals. A social network database may include data inputted by users who are members of the social network. In embodiments, a repository of a social network database may be a location (e.g., servers) where data inputted by users belonging to the social network is stored and may be accessible to the computer-implemented method. A social network may include an online networking service where users may share data (e.g., photos, hyperlinks, personal information) and communicate with one another.

In embodiments, non-categorized individuals may include individuals associated with a user of the computer-implemented method through social media networks. The computer-implemented method may access contact data provided by a user, and may utilize the contact data to crawl the repositories of social network databases. In various embodiments, contact data may include login information for a social network database (e.g., an identification and associated password) or contact data may include an established list of individuals known to the user utilizing the computer-implemented method (e.g., mobile phone contacts, email contacts).

For example, a user of the computer-implemented method may be a member of the online service Facebook®. The computer-implemented method may utilize the login name and password of the user to access the repositories of the social network database Facebook®, and may cross reference mobile phone contacts of the user with individual profiles within Facebook® to identify facial images for the mobile phone contacts of the user. In certain embodiments, the computer-implemented method may collect any facial image accessible within the repositories of the social network database to be used for a comparison with the facial image of the visitor.

The facial image of the visitor may be compared with the collected facial images of non-categorized individuals stored in the repository of non-categorized individuals. Based upon comparing, a facial image of a second individual may be identified which results in an image match score that is outside of an image match threshold. If a facial image is identified which results in an image match score that is outside of an image match threshold, categorization data associated with the second individual may be collected and gathered from the repositories of social network databases. In embodiments, categorization data may include information associated with an individual that may be used to sort the individual into one of the three categories described above. In various embodiments, collecting categorization data may include accessing published law enforcement databases or online employee directories or school directories. In further embodiments, categorization data may include image data. For instance, continuing the example described above, if a second individual is identified within the repository of the social network database Facebook®, the categorization data listed on the profile of the second individual may be collected, such as employment information, educational institutions attended or known family members who also maintain profiles on the repositories of the social network database Facebook®.

Based upon the categorization data, the second individual may be sorted into one of the three categories. In various embodiments, the sorting may be performed at either the repository of pre-categorized individuals or at the repository of non-categorized individuals. For instance, continuing the example above, if the second individual has employment information listed on their Facebook® profile which matches employment information contained on the profile of the user of the computer-implemented method (e.g., the second individual and the user worked for the same company), then the second individual may be sorted into the second category, or friends of family members of a user. In embodiments, by sorting the second individual into one of the three categories, a profile may be made for the second individual to be used as a pre-categorized individual for future comparisons. If a profile is sorted within the repository of non-categorized individuals, the profile may be used to update the repository of pre-categorized individuals. The profile may include any collected categorization data. The collected categorization data may be used to implement a geometric learning process to build a facial data model associated with the facial images of the second individual. The geometric learning process may be an algorithm which analyzes the relative position, size, and/or shape of features on the face of an individual (e.g., eyes, nose, cheekbones, jaw). The analysis results may be used to create the facial data model. The facial data model may be a collection of analysis results from the geometric learning process and may be incorporated into a profile for the second individual. In various embodiments, the facial data model may be used to determine an image match score by comparing facial feature ratios from one facial image with another facial image.

In embodiments, an access permission level for a visitor may be determined and then provided to a user. The access permission level may be based on the image match score previously determined and the category which the visitor was sorted into. An access permission level may include a green indicator, a yellow indicator, or a red indicator. The colors of the indicators may be a visual suggestion to the user of the computed implemented method as to whether or not to unlock the computerized locking mechanism. In certain embodiments, the computerized locking mechanism may be automatically unlocked as a result of a determined access permission level. In various embodiments, determining an access permission level may include accessing a security policy. A security policy may utilize an identification value matrix to define an access permission level. The security policy may be user-defined and may be updated over time as more visitors who request access to a building are evaluated. The identification value matrix may be an array utilizing image match scores and categories to determine access permission levels for individuals sorted into specific categories.

For instance, continuing the example described above, if comparing the facial image of the visitor and the facial image of the second individual results in an image match score of 75% and, based upon the categorization data, the second individual is sorted into the second category, a green indicator may be displayed on the personal computer to a user on a monitor through a graphical user interface. The green indicator may be due to a security policy which defines that a visitor who is sorted into the second category (e.g., friends of family members of the user) and results in an image match score above an image match threshold of 50%, may be granted access. In embodiments, providing the access permission level to a user may include receiving at the monitoring device, the access permission level for the visitor as well as the facial images used to calculate the image match score. Additionally, categorization data collected for visitor may be displayed. For instance, continuing the example described above, a user may view on a monitor through a graphical user interface the facial image captured with the monitoring device of the visitor, the facial image of the second individual used to determine the image match score, and any categorization data collected associated with the second individual, such as the employment information used to sort the individual into the second category from the example above. In certain embodiments, the computer-implemented method may be unable to identify a facial image from either the repository of pre-categorized individuals or the repository of non-categorized individuals. When the computer-implemented method is unable to identify a facial image, it may automatically contact (e.g., through a mobile or hand-held device) a second user to identify the first individual.

FIG. 1 depicts a high level block diagram of a system 100 for utilizing repositories of social network databases for calculating an access permission level. The system 100 may utilize a monitor module 102 to capture a facial image of a visitor, and may either compare the captured facial image of the visitor with facial images of pre-categorized individuals in the pre-categorized module 104 or may create a new profile for the visitor at the registration module 106. In response to creating a new profile at the registration module 106, a social data module 108 may synchronize with a contact module 110, and may begin crawling the repositories of social network databases for facial images of non-categorized individuals in the crawling module 112.

Facial images of the non-categorized individuals may be used to create a facial data model at the facial model module 114. The facial images and associated facial data models may be stored in a database 116. The database 116 may be used to compare the captured facial image of a visitor with the facial images of the non-categorized individuals. If comparing the captured facial image of a visitor with the facial image of a non-categorized individual results in an image match score above an image match threshold, categorization data may be collected at the crawling module 112, modeled at the facial model module 114, and sorted at the categorization module 118. Once sorted, a profile containing the collected categorization data, facial data models, and image match scores may be sent to the pre-categorized module 104. In various embodiments, the security module 120 may access the database 116 to collect the profile for the visitor and to define an access permission level for the visitor.

A monitoring device 122 may include a monitoring module 102, a pre-categorized module 104, a security policy module 120, and a computerized locking mechanism 124. In certain embodiments, the monitoring device 122 may be a computer system installed within an entry to a building or location. In further embodiments, the monitoring device 122 may include a monitor accessible by a user including a graphical user interface which may display access permission levels to a user. The monitor module 102 may capture a facial image of a visitor. In various embodiments, the monitor module 102 may include at least one camera or a motion sensor including a lighting sensor. In embodiments, capturing the facial image of a visitor may be initiated by a motion sensor as a visitor approaches the entrance to a building where the system 100 has been implemented. In various embodiments, capturing the facial image of a visitor may be initiated as the visitor interacts (e.g., physically touches) the computerized locking mechanism 124. The facial image of the visitor may be captured by one or more cameras. In certain embodiments, initiating capturing the facial image of an individual using a motion sensor may include modifying the ambient lighting outside of the entrance to the building using the lighting apparatus. For example, if a visitor approaches the building at night, the motion sensor may detect the visitor and the lighting sensor may brighten the ambient lighting before capturing the facial image.

If a facial image is captured at the monitor module 102, the system 100 may compare the captured facial image of the visitor with the facial images of pre-categorized individuals at the pre-categorized module 104. The pre-categorized module 104 may be a repository containing profiles of pre-categorized individuals. In embodiments, profiles of pre-categorized individuals may include facial images, associated facial data models for each pre-categorized individual, and categorization data for each pre-categorized individual (e.g., data used to sort each individual into one of the three categories). The facial data models may include ratios of distances between dominant facial features (e.g., the ratio of the distance between the eyes and the width of the face). In embodiments, an algorithm may be used to build an initial facial data model for the facial image of the visitor. Comparing the facial image of the visitor with the facial images of pre-categorized individuals may include utilizing the facial data models stored within the profiles of the pre-categorized individuals. The facial image of the visitor may be compared with the facial images and their associated facial data models from each of three categories described herein.

In certain embodiments, if comparing the facial images of a pre-categorized individuals with the facial image of the visitor does not result in an image match score outside of an image match threshold, the facial image of the visitor may be used to register the visitor and create a new profile for the visitor. For example, comparing the facial image of a visitor and the facial image of a pre-categorized individual may result in an image match score of 35%. Based upon an image match threshold, this may be below the minimum image match score required to positively identify a visitor from the facial images of pre-categorized individuals. In embodiments, if an image match score is below the image match threshold, the initial facial data model for the facial image of the visitor may be sent to the registration module 106 to create a new profile for the visitor. In certain embodiments, comparing the facial images of the pre-categorized individuals with the facial image of the visitor and registering a new profile for the visitor may be done simultaneously. If a profile for the visitor is created and then subsequently, a facial image of a pre-categorized individual is found to result in an image match score outside of the image match threshold, the profile of the facial image of the pre-categorized individual may be updated with the initial facial data model created for the visitor.

In embodiments, if comparing the facial image of the visitor with facial images of pre-categorized individuals results in an image match score outside of an image match threshold, the system 100 may access the security policy module 120. The security policy module 120 may define an access permission level for a visitor. In embodiments, the security policy module 120 may be connected to and control the computerized locking mechanism 124. The security policy module 120 is discussed in further detail herein.

If comparing the facial image of a visitor with the facial images of pre-categorized individuals does not result in an image match score outside of an image match threshold, the initial facial data model and the facial image of the visitor may be grouped together at the registration module 106 in a new profile for the visitor and the data contained in the new profile for the visitor may be sent through a network to the social data module 108. The social data module 108 may be a server. In various embodiments, the social data module 108 may be a shared pool of configurable network computing resources or a communication network. The social data module 108 may be in constant communication with the pre-categorized module 104, the registration module 106, the contact module 110, and the database 116. The modules may communicate with each other over a network. In embodiments, the social data module 108 may be a hub which other modules within system 100 may establish a communication connection.

In some embodiments, the network can be implemented by suitable communications media (e.g., wide area network (WAN), local area network (LAN), Internet, and Intranet). In certain embodiments, modules within the system 100 may be local to each other, and communicate via appropriate local communication medium (e.g., local area network (LAN), hardwire, wireless link, Intranet).

The social data module 108 may synchronize with the contact module 110. Synchronizing the contact module 110 and the social data module 108 may include transferring data stored in the contact module 110 to the social data module 108. In embodiments, the contact module 110 may operate on a variety of devices. Such devices may include but are not limited to mobile and hand-held devices (e.g., laptops, mobile phones, personal or enterprise digital assistants, and similar apparatus), personal computers, servers, or other computer systems that can access the services and functionality provided by the social data module 108. The contact module 110 may include an application downloaded to the mobile phone of a user. In embodiments, for example, the application may be used to access data stored in the mobile phone and subsequently, the data stored in the mobile phone may be used to search for non-categorized individuals on the repositories of social network databases. In various embodiments, categorization data stored on the mobile phone of a user, such as photos or contact information (e.g., email addresses) may be used to crawl the repositories of social network databases. In further embodiments, contact data stored within the mobile phone of a user (e.g., login credentials for social network applications) may be transferred to the social data module 108.

The crawling module 112 may utilize the data synchronized from the contact module 110 to the social data module 108 to crawl the repositories of social network databases. For example, the crawling module 112 may access a variety of repositories of social network databases using the login credentials of the user. In embodiments, names of individuals within a contacts list on a mobile phone may be used to search and identify non-categorized individuals. For example, if a name on a contacts list contains an associated email address, the crawling module 112 may use the email address to search for and identify a profile associated with the email address within a repository of a social network database. The crawling module 112 may be running continuously to search for facial images and categorization data of non-categorized individuals. The crawling module 112 may implement the algorithm used to create facial data models to identify facial images within the repositories of social network databases. Facial images may be identified within image data or video data stored in the repositories of social network databases. For example, a photo album or video stored within the repository of a social network database may be used to identify facial images of a contact listed on the mobile phone of a user. The facial images identified within the repositories of social network databases may be sent over the network to the facial model module 114.

The facial images of non-categorized individuals collected at the crawling module 112 may be used to create facial data models at the facial model module 114. The facial module 114 may use a geometric learning process to build a facial data model. A geometric learning process may include a system which identifies nodel points (e.g., end points) used to measure facial features on the face of a person, such as the length of width of the nose, the depth of the eye sockets or the shape of the cheekbones. A facial data model may include a series of measurements and distances related to the facial features of an individual. The results of the geometric learning process may be sorted and temporarily stored into a profile for each non-categorized individual in the database 116. In embodiments, the results of the geometric learning process may be sorted and permanently stored into a profile which may be categorized in subsequent modules within the system 100. The database 116 may sort and organize profiles created for non-categorized individuals. In embodiments, the database 116 may be a repository for storing the profiles of non-categorized individuals. In further embodiments, the repository of pre-categorized individuals may be updated by synchronizing with the database 116 through the social data module 108. The database 116 may organize the profiles of pre-categorized individuals into at least one of the three categories. In various embodiments, if profiles created for non-categorized individuals are unable to be sorted into one of the three categories, additional categories may be established. The additional categories may be user-defined and may be based upon user preferences. For example, a user may wish to create an additional category to store profiles for individuals who live within a geographic region.

The social data module 108 may use the profiles of non-categorized individuals stored in the database 116 to compare the captured facial image and facial data model created for the visitor. In response to identifying a facial image of a non-categorized individual which results in an image match score outside of an image match threshold, categorization data associated with the facial image of the non-categorized individual may be collected. In embodiments, the categorization data may be gathered in a similar process to that described for the crawling module 112 and may be stored in profile created for the visitor in the database 116. Categorization data may include any information associated with the facial image of a non-categorized individual. For example, categorization data may include but is not limited to educational history, employment history, habitation locations, relationship statuses, groups associated with within the social network, additional photos/images and consumer preferences.

Utilizing the categorization data, the profile created for the visitor and initially stored in the database 116 may be sorted into the first category, the second category, or the third category at the categorization module 118. Sorting the profile for the visitor into one of the three categories may be based upon a common attribute shared by the visitor and the user or a lack thereof. For example, if the categorization data for the visitor included a list of known family members, and the name of the user was on the list of known family members, then the visitor may be sorted into the first category (e.g., profiles of family members of the user). In another example, if the categorization data for the visitor identified the name of the visitor on a criminal database, the profile for the visitor may be sorted into the third category (e.g., profiles for individuals unidentified by the user/profiles of known dangerous individuals). In various embodiments, additional categories are envisioned. Additional categories may be established by a user and may be governed according to user-defined preferences.

In various embodiments, the system 100 may utilize predefined groups with the repositories of social network databases to sort the profile for the visitor into one of the three categories. For example, if the visitor belongs to a group within the social network that includes members of a specific profession (e.g., a collection of intellectual property professionals) or a group of alumni from an educational institution (e.g., University Engineering Alumni), and the user is also a member of those groups, the profile for the visitor may be sorted into the second category (e.g., friends of family members of a user). In another example, if the profile of a visitor on a social network lists several groups that the visitor belongs to within the social network but the user of the computer-implemented method does not belong to any of the same groups, the profile of the visitor may be sorted into the third group (e.g., individuals unknown to the user). Once the profile of a visitor has been categorized, the profile may be sorted into the corresponding category within the database 116.

The security module 120 may access the database 116 through a network to collect the profile for the visitor and to determine an access permission level for the visitor. The security policy module 120 may be a computing device (e.g., a processor) which implements an identification value matrix to determine access permission levels for specific visitors. Each access permission level may be defined based on an access permission policy. In various embodiments, an access permission policy may include multi-tiered system defining entry privileges. In embodiments, an access permission policy may be set based on the preferences of a user. The preferences of a user may include but are not limited to defining which individuals to let into a building or which actions to take in response to identifying a particular individual. In various embodiments, each access permission level may correspond to a different visual indication. In certain embodiments, an access permission policy may include a color schema for the access permission levels.

For example, a user may wish to define an access permission policy where the color green is displayed to a user in response to identifying a visitor as a pre-categorized individual associated with a first access permission level (e.g., family members of a user). In another example, a user may wish to define an access permission policy where the color yellow is displayed to a user in response to identifying a non-categorized individual whose profile has been subsequently categorized into a second category (e.g., friends of family members of a user). Additionally, continuing the previous example, a user may further define the access permission policy to display the color yellow as well as recommend social methods to further identify a particular visitor (e.g., if the visitor has been found to be a friend of the mother of a user, display the contact information of the mother and recommend contacting the mother before granting access to a building). In an additional example, a user may wish to define an access permission policy where the color red is displayed to a user in response to identifying a non-categorized individual whose profile has been subsequently categorized into the third category (e.g., individuals unknown to the user). Also, if categorization data is collected which includes the name of a visitor on a law enforcement database, a user may define an access permission policy to display the color red as well as recommend contacting police authorities. In certain embodiments, the system 100 may automatically perform actions in response to determining particular access permission levels for visitors (e.g., automatically calling the mother from the example above, automatically contacting law enforcement authorities from the example above).

The identification value matrix may be a dynamic array utilizing an image match score previously calculated for a visitor and the categorization of the profile of the individual with which the visitor is matched. In embodiments, the dynamic array may utilize a category constant to calculate access permission levels. The identification value may be a numerical value that is compared to one or more thresholds in order to determine an access permission level for a visitor. The identification value may change depending upon which category the profile of the matched individual and the preferences of a user. In embodiments, determining an access permission level may be represented by the following equation: $=(IMS) \times (Kc)$, where IV is an identification value, IMS is an image match score, and Kc is a category constant. In further embodiments, an access permission level may be defined based on a series of threshold values, specifically, comparing an identification value to threshold identification values defined by a user.

For example, a user may define his preferences within the security policy module 120 to indicate that if $IV>1$, then the equivalent access permission level may be green, if $IV=1$, then the equivalent access permission level may be yellow, and if $IV<1$, then the equivalent access permission level may be red. In embodiments, utilizing this system may allow a user to define varying levels of access permission depending on both category of matched individual and likelihood of match. In embodiments, threshold identification values may be altered by a user and may be updated over time as access permission levels are calculated for visitors.

The computerized locking mechanism 124 may communicate with and be connected to the monitoring device 122 and the security policy module 120 via a network. In embodiments, the computerized locking mechanism 124 may be a mechanical or electronic fastening device. In certain embodiments, the computerized locking mechanism 124 may be a doorbell. The computerized locking mechanism 124 may be automatically released in response to determining access permission levels. For example, continuing the example described above where an access permission policy has been defined to display the color green to a user in response to identifying a visitor as a pre-categorized individual associated with a first access permission level, the computerized locking mechanism may automatically release as a result of displaying the color green to a user.

Figure 2:
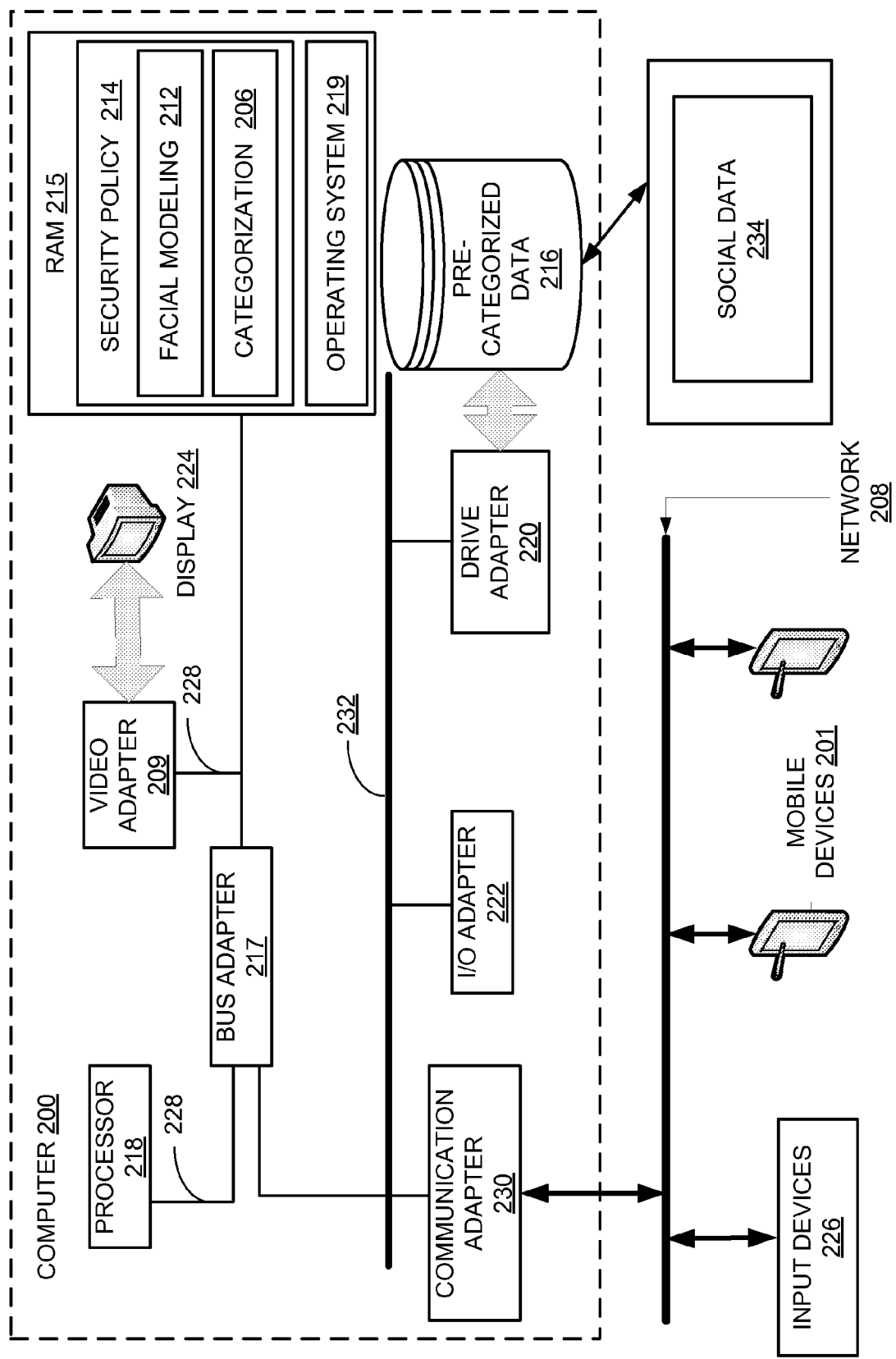
FIG. 2 depicts a block diagram of a system for utilizing repositories of social network databases for calculating an access permission level, according to embodiments.

FIG. 2 depicts a block diagram of automated computing machinery, according to various embodiments. The automated computing machinery may represent a monitor terminal, a pre-categorization server, or a security policy computing device, among others, according to various embodiments. The example computing machinery may include a computer 200 useful in performing aspects of the disclosure, according to various embodiments. The computer 200 of FIG. 2 includes at least one computer processor 218 or central processing unit (CPU) as well as random access memory 215 (RAM) which is connected through bus adapter 217 to processor 218 and to other components of the computer 200. The computing machinery or the processor 218 may include one or more computer processing circuits.

The RAM 215 may include a security policy 214. The security policy 214 may access or control various functions of the RAM 215 of the computer 200, according to various embodiments. The instructions of the security policy 214 and social data 234 may be stored to or read from the pre-categorized data 216, which may be a hard disk drive, according to various embodiments. The communications of the memory controller may be received from various modules located in the RAM 215.

The RAM 215 may include a facial modeling module 212. The instructions (e.g., geometric algorithms) of the facial modeling module 212 instructions may be populated into the pre-categorized data 216. The security policy 214 may control when to grant access to a building. The security policy 214 may access the pre-categorized data 216 as well as the social data 234, according to various embodiments. The security policy 214 may utilize the facial modeling module 212 and the categorization module 206 to create visitor profiles from the social data 234. The profiles created may be stored in the pre-categorized data 216. The security policy 214 may utilize the profiles stored in the pre-categorized data 216 to determine an access permission level for a visitor. Additional modules may be included in the security policy 214, according to various embodiments.

The RAM 215 may include an operating system 219. Operating systems useful for record filtering according to embodiments of the present disclosure include UNIX®, Linux®, Microsoft XP™, AIX®, IBM's i5/OS™, and others. The operating system 219 is shown in RAM 215, but many components of such software typically are stored in non-volatile memory also, such as, for example, in the pre-categorized data 216.

The computer 200 may also include disk drive adapter 220 coupled through expansion bus 232 and bus adapter 217 to processor 218 (and accompanying thread 232) and other components of the computer 200. Disk drive adapter 220 connects non-volatile data storage to the computer 200 in the form of disk drive 216 (e.g., pre-categorized data 216). Disk drive adapters useful in computers include Integrated Drive Electronics (IDE) adapters, Small Computer System Interface (SCSI) adapters, Serial AT Attachment (SATA), and others. Non-volatile computer memory also may be implemented for as an optical disc drive, electrically erasable programmable read-only memory (so-called 'EEPROM' or 'Flash' memory), RAM drives, etc.

The pre-categorized data 216 may include one or more storage devices in a tiered or non-tiered configuration. The pre-categorized data 216 may include one or more memory chip thermal profile inputs that are received by social data 234 and stored for later use by the security policy 214 through RAM 215.

The example computer 200 may include one or more input/output (I/O) adapters 222. I/O adapters implement user-oriented input/output through, for example, software drivers and computer hardware for controlling output to display devices such as computer display screens 224, as well as user input from user input devices 226 such as keyboards, mice, styli, or touchscreens, according to various embodiments. The example computer 200 may include a video adapter at 209, which is an example of an I/O adapter specially designed for graphic output to a display device 224 such as a display screen or computer monitor. The video adapter (I/O) would be connected to processor 218 through a bus adapter 217, and the front side bus 228, which is also a high-speed bus.

The example computer 200 includes a communications adapter 230 for data communications with other computers, for example, mobile devices 201, and for data communications with a data communications network 208. Such data communications may be carried out serially through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network 208. Examples of communications adapters include modems for wired dial-up communications, Ethernet (IEEE 802.3) adapters for wired data communications network communications, and IEEE 802.77 adapters for wireless data communications network communications.

Figure 3:
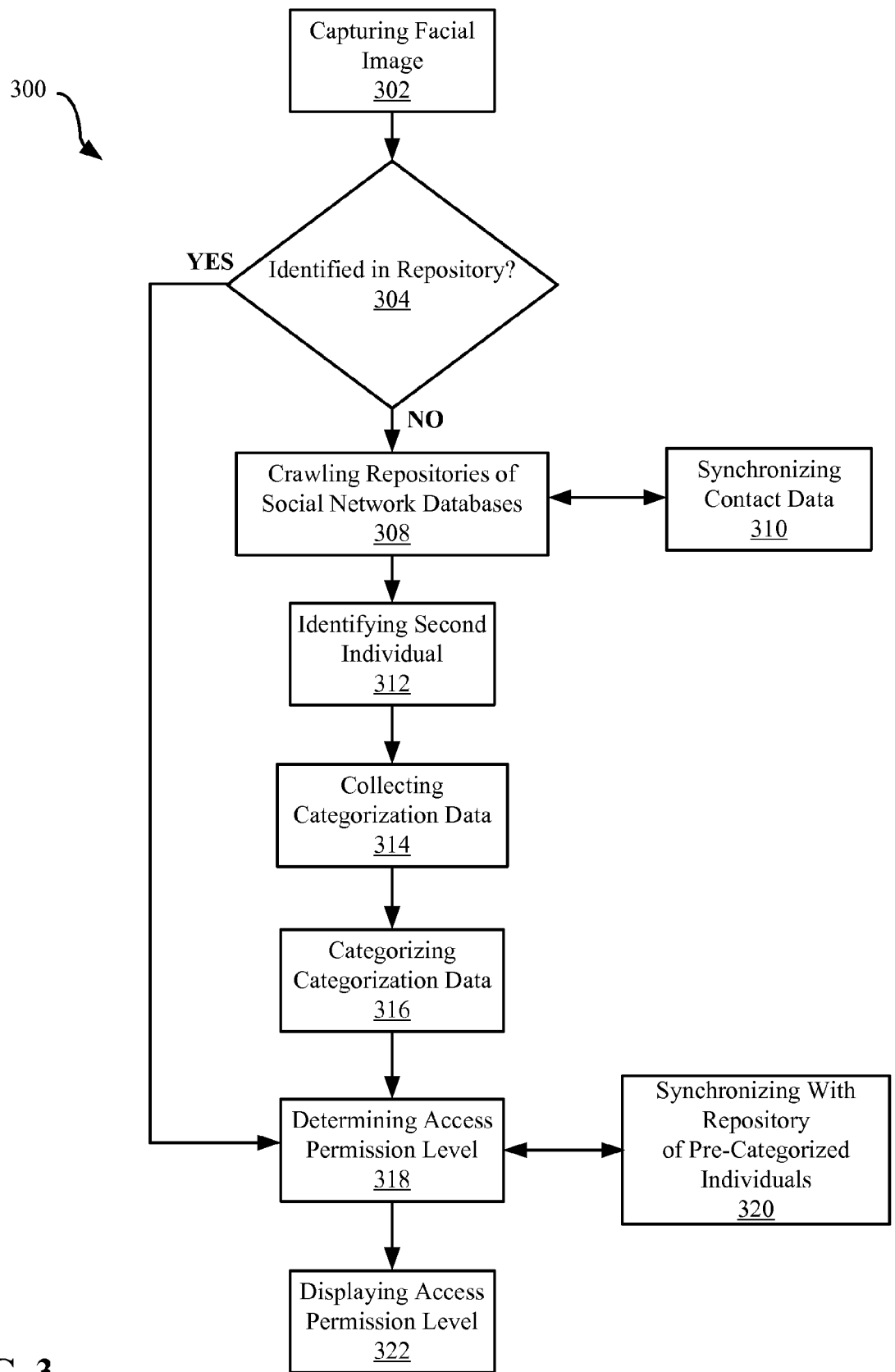
FIG. 3 is a process illustrating a method for utilizing repositories of social network databases for calculating an access permission level, according to embodiments.

FIG. 3 is a flowchart illustrating a process for utilizing repositories of social network databases for calculating an access permission level, according to embodiments. The method 300 involves capturing the facial image of a visitor, comparing the facial image of the visitor with the facial images of pre-categorized individuals, crawling the repositories of social network databases, identifying a second individual, collecting categorization data on the second individual, and determining access permission levels for the visitor. The method 300 may begin at operation 302 by capturing the facial image of a visitor. Capturing a facial image may include utilizing a camera to collect image data (e.g., a photograph) or video data (e.g., moving visual media).

In operation 304, in response to capturing a facial image of a visitor, the facial image of the visitor may be compared with a repository of facial images of pre-categorized individuals. Comparing the facial image of the visitor with the repository of facial images of pre-categorized individuals may include creating an initial facial data model for the facial image of the visitor. A facial data model may be created using a geometric algorithm which measures and records dominant facial feature ratios (e.g., nose 0.72, eyes 0.35, ear 0.45, eyebrow 0.78, forehead 0.66, chin 0.10, mouth 0.32). In embodiments, the facial data model created for the facial image of the visitor may be used only for a comparison with pre-categorized individuals. In certain embodiments, the facial data model created for the facial image of the visitor may be used in subsequent comparisons with other facial images of non-categorized individuals.

Identifying a facial image within the pre-categorized facial images may include comparing the ratios measured from the facial image of the visitor with the ratios stored in the profiles for the pre-categorized individuals. If the ratios stored in a profile of a pre-categorized individual and the ratios measured for the captured facial image of the visitor result in an image match score outside of an image match threshold, an access permission level may be determined for the visitor at operation 318 and the determined access permission level may be displayed to a user at operation 322.

If the ratios stored in the profiles of pre-categorized individuals and the ratios measured for the captured facial image of the visitor do not result in an image match score outside of an image match threshold, the repositories of social databases may be crawled in operation 308. Crawling the repositories of social databases in operation 308 may include synchronizing the contact data of a user in operation 310. Aspects of the present disclosure may be similar or the same as aspects described in FIG. 1 with respect to the contact module 110. For example, an application downloaded to the hand-held device of a user may be used to access information stored on the hand-held device, such as an address book or social media credentials (e.g., username and password).

In certain embodiments, an application downloaded to the hand-held device of a user may be used to update the repository of pre-categorized individuals with information collected from the hand-held device (e.g., including a new email address for the profile of a pre-categorized individual). In various embodiments, information collected from the hand-held device may include categorization data. In further embodiments, an application downloaded to the hand-held device of a user may be used to edit the categories which profiles are stored into. For example, a user may be able to view on their hand-held device the profiles of pre-categorized individuals, and may be able to selectively move profiles of pre-categorized individuals from one category to another category. For instance, a user may move a profile of a brother-in-law which was sorted into a category for friends of family members of a user to the category for family members of a user.

A web crawler in operation 308 may utilize the information collected in operation 310 to search for facial images of non-categorized individuals within the repositories of social media databases. For example, a photo stored on a mobile phone may be used to search for and identify a non-categorized individual. In another example, an email address for a new contact may be used to search for and identify a facial image for that new contact. Aspects of the present disclosure may be similar or the same as aspects described in FIG. 1 with respect to the crawling module 112.

In operation 312, a facial image of a second individual may be identified as a result of crawling the repositories of social media databases in operation 308. In embodiments, the second individual and the visitor may be the same person. Identifying the facial image of a second individual may include utilizing the initial facial data model for the facial image of the visitor to compare facial images collected from crawling the repositories of social media databases. In embodiments, when facial images are collected from the repositories of social media databases, initial facial data models may be created for the collected facial images in a manner similar to the facial data model created for the visitor. Identifying a second individual may include determining that the facial image of the visitor and a facial image collected from the repository of a social media database that results in an image match score outside of an image match threshold.

For example, an image which depicts three non-categorized people may be collected from the repository of a social media database. For each of the three people depicted, an initial facial data model may be created. The ratios of the facial data models of the people from the image may each be compared with the facial data model of the visitor. By comparing the facial data model of the visitor with the facial data models for the three people, an image match score for one of the three people from the image may be above an image match threshold (e.g., 60% image match score above a 50% image match threshold). Consequently, the person whose facial data model resulted in an image match score above the image match threshold may be the second individual the method 300 is seeking to identify.

In operation 314, in response to identifying a second individual, categorization data for the second individual may be collected. For instance, continuing the example above, if the image containing the second individual was collected from the repository of the social network database Facebook®, and the second individual has their own profile, data may be collected from the profile of the second individual. In further embodiments, data collected from the repository of one social network database may be used to collect data from the repository of another social network database. For example, if the profile of a second individual on the social network Facebook® contained employment information, the employment information collected from Facebook® may be used to search for additional categorization data within the repository of the social network LinkedIn®.

In operation 316, categorization data collected from the repositories of social networks as well as the initial facial data model created for the visitor may be joined together in a profile within a database. The profile of the visitor may be sorted into one of three categories. In embodiments, sorting the profile of a visitor into one of the three categories may include utilizing a natural language processing technique to analyze syntactic and semantic content. The natural language processing technique may identify common attributes between the user and the visitor. A common attribute may include a minimum connection a user may have with a visitor (e.g., the user and the visitor have the same friends, the user and the visitor are related, the user and the visitor lived in the same city).

In embodiments, the natural language processing technique may be configured to parse structured data (e.g., tables, graphs, images) and unstructured data (e.g., textual content containing words, numbers). In certain embodiments, the natural language processing technique may be a software tool or other program configured to analyze and identify the semantic and syntactic elements and relationships present in the within the repositories of social network databases.

More particularly, the natural language processing technique can be configured to parse the grammatical constituents, parts of speech, context, and other relationships to identify common attributes between a user and a visitor. The natural language processing technique can be configured to recognize keywords, contextual information, and metadata tags associated with phrases, sentences, or images. In certain embodiments, the natural language processing technique can analyze summary information, keywords, figure captions, or text descriptions included in some social network profiles, and identify syntactic and semantic elements between data collected from a user and data collected for a visitor. The syntactic and semantic elements can include information such as word frequency, word meanings, text font, italics, hyperlinks, proper names, noun phrases, parts-of-speech, or the context of surrounding words. Other syntactic and semantic elements are also possible.

For example, a visitor may maintain a profile within a social network website (e.g., Facebook®). Within that profile, the visitor may have a collection of photos. The natural language processing technique may analyze the collection photos such that the content within the photos (e.g., people, places, objects) may be used to identify common attributes with content listed on the profile of the user within the same social network (e.g., the user and the visitor have pictures with some of the same people, the user and the visitor have similar entertainment interests). By identifying common attributes, such as the user and the visitor have pictures with the same people, the method 300 may sort the profile of the visitor into the second category, friends of family members of a user.

In certain embodiments, the method 300 may be unable to identify a common attribute between the user and the visitor. For example, the categorization data collected from the repositories of social network databases for the visitor may have no connection to the user. For instance, the user and the visitor may have never worked together, the user and the visitor may have never lived in the same city, or the user and the visitor do not know any of the same people. In this situation, the profile of the visitor may be sorted into the third category, individuals unknown to the user, until additional data is collected in operation 314 or synchronized in operation 310, to further categorize the profile of the visitor. In various embodiments, the third category, individuals unknown to the user, may be further sorted based upon common attributes found between profiles stored in the third category. For instance, two profiles which may not have been sorted into the first to categories may be grouped together within the third category based upon a common attribute identified using the natural language processing technique.

In operation 318, an access permission level may be determined. Aspects of the present disclosure may be similar or the same as aspects described in FIG. 1 with respect to the security policy module 120. In embodiments, determining an access permission level may include synchronizing the results of the access permission level determination with the repository of pre-categorized individuals. In certain embodiments, the results of the access permission level determination may be used to monitor the method 300 over time such that a user may adjust their preferences retroactively. For example, a user may become informed that an image match threshold is too high due to a pre-defined access permission policy and may lower the threshold if they desire.

In operation 322, an access permission level may be displayed to the user for the visitor requesting permission to enter a building. The access permission level may be displayed on a monitor to a user through a graphical user interface. In embodiments, the access permission level may be displayed to the user for the visitor requesting permission to enter a building through the hand-held device used to synchronize contact data in operation 310. In certain embodiments, the access permission level may be displayed at multiple devices simultaneously. For example, if a visitor initiates the method 300, a user currently inside a home may view the access permission level through a monitor and a separate user currently away from the same home may view the access permission level through a hand-held device. In various embodiments, displaying the access permission level may include displaying the categorization data as well as numerical values including but not limited to image match scores and image match thresholds.

In additional embodiments, a user may view the facial image and categorization data for an individual determined to be a second individual in conjunction (e.g., in combination) with facial images of individuals which were close but did not go outside of the image match threshold. For example, if there are two profiles of categorized-individuals which were analyzed to be close to an image match threshold, a user may view these profiles to determine if there may have been a false positive. In certain embodiments, displaying the access permission level may include utilizing a noise (e.g., tone) schema for the access permission levels. For example, in addition to displaying certain colors for specific access permission levels, a sound may be generated for specific permission levels (e.g., an alarm sound for an identified visitor whose categorization data included outstanding warrants on a police database).

FIG. 4 illustrates an identification value matrix, according to embodiments. The identification value matrix may include a series of rows 402 and a series of columns 404. The series of rows 402 may include a plurality of categories 406-410. In embodiments, the categories may be representative of the groups which profiles of pre-categorized individuals have been sorted into. In various embodiments, the categories may be representative of the groups a visitor could be potentially sorted into. The series of columns 404 may include a plurality of elements 412-422 used to determine an access permission level. The image match score column 412 may be a numerical value representing the score resulting from comparing the facial data model of a visitor with a facial data model of either pre-categorized individuals or non-categorized individuals. In various embodiments, the numerical value within the image match score column 412 may have previously compared with an image match threshold before being used to calculate an access permission level. The category constant column 414 may include numerical values associated with each category. In embodiments, the category constant may be different for each category. For example, the category constant for the family category may be a higher numerical value than the category constant for the friends of family category. In certain embodiments, a user may define the category constant.

The identification value column 416 may include the identification value determined using numerical values from the image match score column 412 and the category constant column 414. Aspects of the present disclosure may be similar or the same as aspects described in FIG. 1 with respect to the security policy module 120. The series of columns 404 further include a plurality of threshold columns 418-422. The threshold columns 418-422 may be representative of an access permission policy. Each threshold column 418-422 may indicate a specific access permission level, where each level is defined by a numerical range and may be displayed to a user utilizing a color schema. In embodiments, the numerical range defining each access permission level may vary depending upon the category. For example, in the family category row 406, the threshold 1 column 418 may represent an access permission level for a potentially identified family member using the numerical range of $1<IV<X$, where "IV" is the identification value and X is an upper limit to the numerical range (e.g., threshold). The value of X may change as more visitors are evaluated and may vary according to user preferences. If the identification value for the potentially identified family member is greater than 1 but less than X, the identification value matrix may display to a user an access permission level of yellow. In contrast, in the unknown category row 410, the threshold 1 column 418 may represent an access permission level for a potentially unknown visitor using the numerical range of 0<IV<X. Thus, if the identification value for the potentially identified unknown visitor is greater than 0 but less than X, the identification value matrix may display to a user an access permission level of red.

FIG. 5 illustrates an example implementation of an identification value matrix, according to embodiments. The family category row 502 includes numerical values and ranges used to determine an access permission level. In this example, a facial image was captured of a visitor, and a facial data model for the visitor was created. Using the facial data model for the visitor, a pre-categorized individual or a non-categorized individual was identified and an image match score was calculated, as indicated in the image match score column 504. If the profile of the pre-categorized individual was stored in the family category or if, after collecting categorization data, the non-categorized individual was sorted into the family category, a category constant for the family category may be applied, as indicated in the category constant column 506.

The identification value column 508 may indicate the result of utilizing the image match score column 504 and the category constant column 506. The numerical value obtained in the identification value column 508 may be compared with the numerical ranges displayed in the threshold columns 510-514. Applying the numerical value obtained in the identification value column 508 to the numerical ranges in the threshold columns 510-514, the identification value is above the threshold 1 column but below the threshold 3 column. Accordingly, the identification value obtained in the identification value column 508 corresponds with an access permission level defined by an access permission policy using the threshold 2 column 512 as the numerical range. In embodiments, the access permission level corresponding with the threshold 2 column 512 may result in displaying a yellow access permission level to a user. The yellow access permission level, as defined by a user, may indicate to a user that the individual standing at the door is probably a family member, but may need additional verification before granting access to a building.

Figure 6:
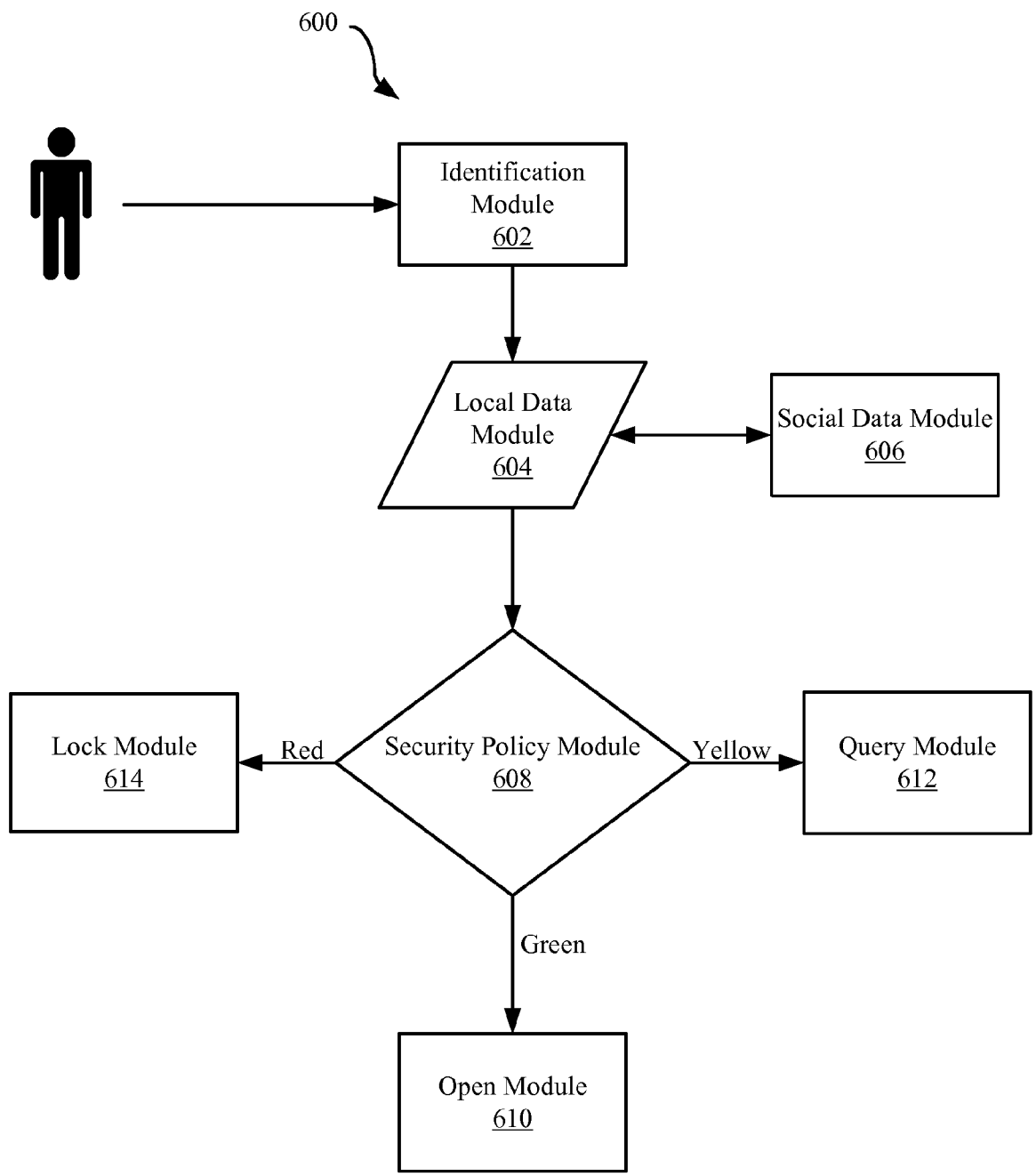
FIG. 6 depicts a block diagram of a monitoring device system, according to embodiments.

FIG. 6 depicts a block diagram of a monitoring device system 600, according to embodiments. The monitoring device system 600 may include an identification module 602, a local data module 604, a social data module 606, a security policy module 608, and an open, query, and lock modules 610-614, respectively. Aspects of the present disclosure may be similar or the same as aspects described in FIG. 1 with respect to the monitoring device 122.

A facial image of a visitor may be captured at the identification module 602. Aspects of the present disclosure may be similar or the same as aspects described in FIG. 1 with respect to the monitoring module 102. The facial image of the visitor captured at the identification module 602 may be compared with facial images of pre-categorized individuals at the local data module 604. Aspects of the present disclosure may be similar or the same as aspects described in FIG. 1 with respect to the pre-categorized module 104. The local data module 604 may be a repository containing profiles of pre-categorized individuals, where a profile may include facial images as well as relevant identification information (e.g., employment history, relationship to members of a house). In embodiments, the local data module 604 may be updated with data collected at the social data module 606. The local data module 604 may synchronize with the social data module 606 to add profiles to, remove profiles from, or edit profiles stored in, the local data module 604. The social data module 606 may crawl the repositories of social network databases (e.g., Twitter®, Myspace®) to collect categorization data, and may transmit the categorization data to the local data module 604.

If a visitor has been categorized into one of three categories, the security policy module 608 may determine an access permission level for the visitor utilizing an image match score, the category which the visitor was sorted into, and categorization data associated with the visitor. The security policy module 608 may control the open module 610, the query module 612, and the lock module 614. Aspects of the present disclosure may be similar or the same as aspects described in FIG. 1 with respect to the security policy module 120. In response to determining an access permission level for a visitor, the open module 610, the query module 612, or the lock module 614 may be initiated. In embodiments, modules 610-614 may be in communication with a computerized locking mechanism which controls entry to the building or location utilizing system 600. The open module 610 may be initiated in response to determining that the visitor is an individual to whom the user wishes to grant entry, such as individuals sorted into the first category (e.g., as defined by an access permission policy). In embodiments, the open module 610 may include releasing the computerized locking mechanism. In certain embodiments, the open module 610 may include displaying a color (e.g., green) indicator to a user corresponding with the determined access permission level.

The query module 612 may be initiated in response to determining that the visitor is an individual whom the user may know, such as individuals sorted into the second category (e.g., as defined by an access permission policy). In embodiments, the query module 612 may send a notification of the profile of a visitor to other members of the building or location through a short message service or similar communication technique. In certain embodiments, the query module 612 may automatically call the mobile phone of other members of the building or location to connect a user who is unsure whom the visitor is with another user who may recognize the visitor. In various embodiments, the query module 612 may include displaying a color (e.g., yellow) indicator to a user corresponding with the determined access permission level.

The lock module 614 may be initiated in response to determining that the visitor is not recognized or has not been sorted into the first or second categories (e.g., as defined by an access permission policy). In embodiments, the lock module 614 may include not releasing the computerized locking mechanism. In certain embodiments, the lock module 614 may be overridden by a user to release the computerized locking mechanism. The lock module 614 may, in response to identifying a visitor as a criminal (e.g., categorization data collected for the visitor includes a photo from a law enforcement database), automatically contact police authorities. In various embodiments, the lock module 614 may include displaying a color (e.g., red) indicator to a user corresponding with the determined access permission level.

Figure 7:
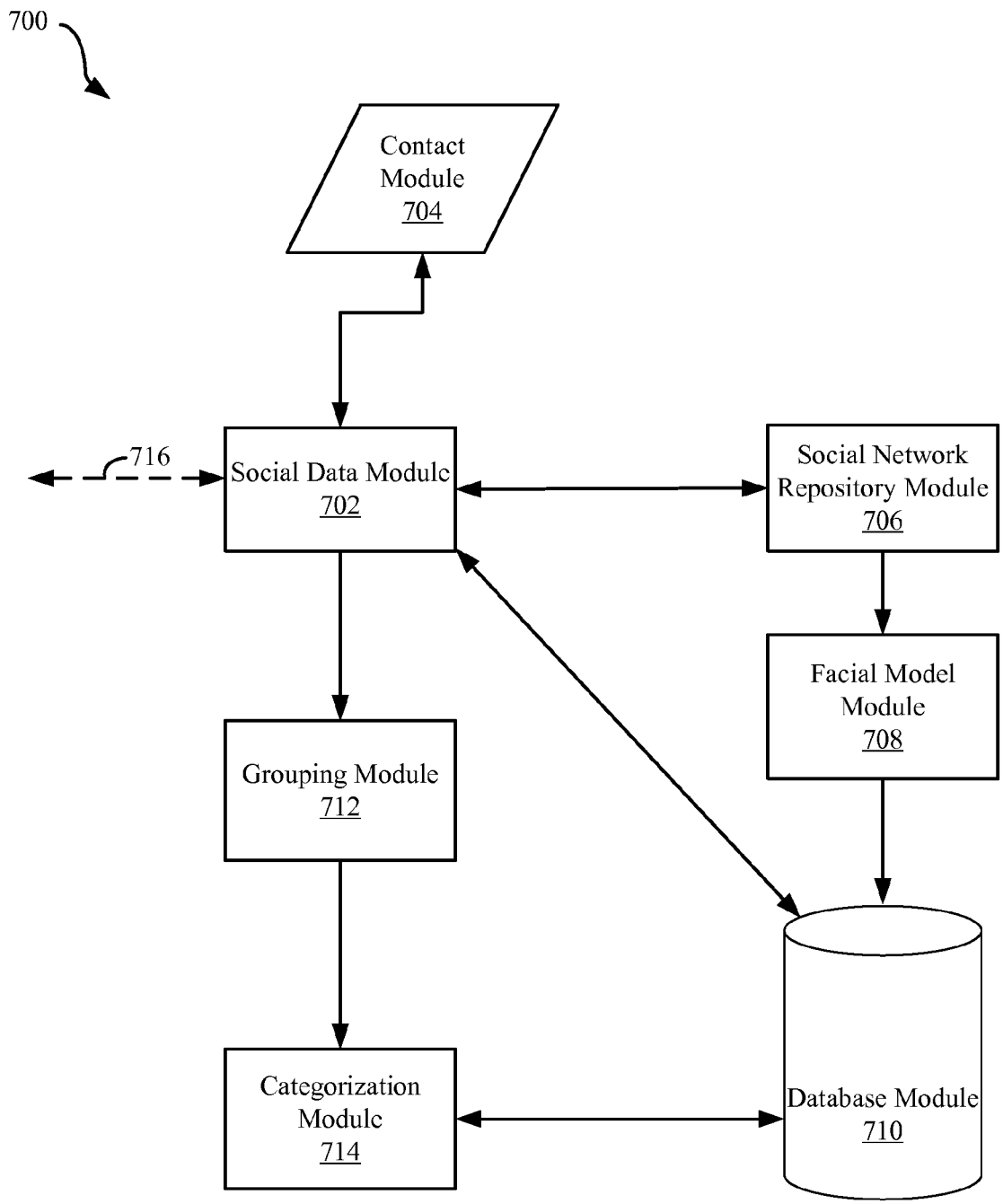
FIG. 7 depicts a block diagram of a social data system, according to embodiments.

FIG. 7 depicts a block diagram of a social data system 700, according to embodiments. The system 700 may include a social data module 702, a contact module 704, a social network repository module, a facial module 708, a database module 710, a grouping module 712, a categorization module 714, and a synchronization process 716. The modules within system 700 may communicate with and transfer data to each other through a network.

In embodiments, the system 700 may be initiated when the facial image of a visitor is compared with facial images stored in profiles in a repository of pre-categorized individuals, and the facial image of the visitor is unable to be identified within the repository of pre-categorized individuals (e.g., an image match score is unable to result in a score outside of an image match threshold). In certain embodiments, the system 700 may be running continuously and may be initiated without capturing the facial image of a visitor. Aspects of the present disclosure may be similar or the same as aspects described in FIG. 1 with respect to the social data module 108 and the contact module 110. The social data module 702 may synchronize with the contact module 704 to transfer data stored in the contact module 704 to the social data module 702. In embodiments, the contact module 704 may be a mobile or hand-held device. The contact module 704 may further include data to be used to search for non-categorized individuals, such as messaging data (e.g., information derived from messages sent/received) or digital video data. In various embodiments, the data to be used by the social data module 702 transferred from the contact module 704 may be considered categorization data.

The social data module 702 may utilize the data transferred from the contact module 704 to crawl for further categorization data for non-categorized individuals in the social network repository module 706. The social network repository module 706 may include repositories of social network databases. Aspects of the present disclosure may be similar or the same as aspects described in FIG. 1 with respect to crawling module 112. Categorization data collected from the social network repository module 706 may be transferred to both the facial model module 708 and the social data module 702. In embodiments, only image data may be sent to the facial model module 708 whereas any categorization data not determined to be image data may be sent to the social data module 702.

The facial model module 708 may use a geometric learning processing to build facial data models for non-categorized individuals from the image data collected from the social network repository module 706. Aspects of the present disclosure may be similar or the same as aspects described in FIG. 1 with respect to the facial model module 114. The facial data models for non-categorized individuals may be sent to and stored within the database module 710. In response to receiving categorization data at the social data module 702 from the social network repository module 706, the social data module 702 may transfer the categorization data to the grouping module 712. The grouping module 712 may include sorting the categorization data for each non-categorized individual into a profile for each non-categorized individual. The grouping module 712 may utilize natural language processing techniques discussed herein to identify similarities and patterns within the categorization data in order to accurately match categorization data with the profile of a non-categorized individual.

In response to sorting the categorization data for non-categorized individuals into profiles for each non-categorized individual, the grouping module 712 may transfer the profiles containing categorization data to the categorization module 714. Aspects of the present disclosure may be similar or the same as aspects described in FIG. 1 with respect to the categorization module 118 and may be similar or the same as aspects described in FIG. 3 with respect to operation 316. The categorization module 714 may analyze the categorization data stored in the profile for each non-categorized individual in order to sort the non-categorized individuals into one of at least three categories. Once sorted into a category, the categorized profiles and the categorization data stored within the profiles may be transferred from the categorization module 714 to the database module 710. In certain embodiments, the database module 710 may be a repository which stores the profiles for non-categorized individuals (e.g., profiles of individuals who have not been sorted into a category). In embodiments, sorting the profiles of non-categorized individuals into one of at least three categories may include comparing profiles stored within the database module 710 to facilitate the sorting process. The database module 710 may organize the profiles of individuals according to the category which they were sorted into. In certain embodiments, the database module 710 may group the facial data models created at the facial model module 708 with the categorized profiles sent to the database module 710.

In the synchronization process 716, the social data module 702 may retrieve the categorized profiles from the database module 710 and transfer the categorized profiles to a repository of pre-categorized individuals. In various embodiments, the synchronization process 716 may only transfer new categorization data for pre-categorized individuals from the database module 710 to a repository of pre-categorized individuals. In embodiments, initiating the synchronization process 716 may be in response to a visitor being unable to be identified within a repository of pre-categorized individuals. In further embodiments, initiating the synchronization process 716 may done automatically when new categorization data has been collected, when a new profile has been created, or when a new profile has been categorized.

Figure 8:
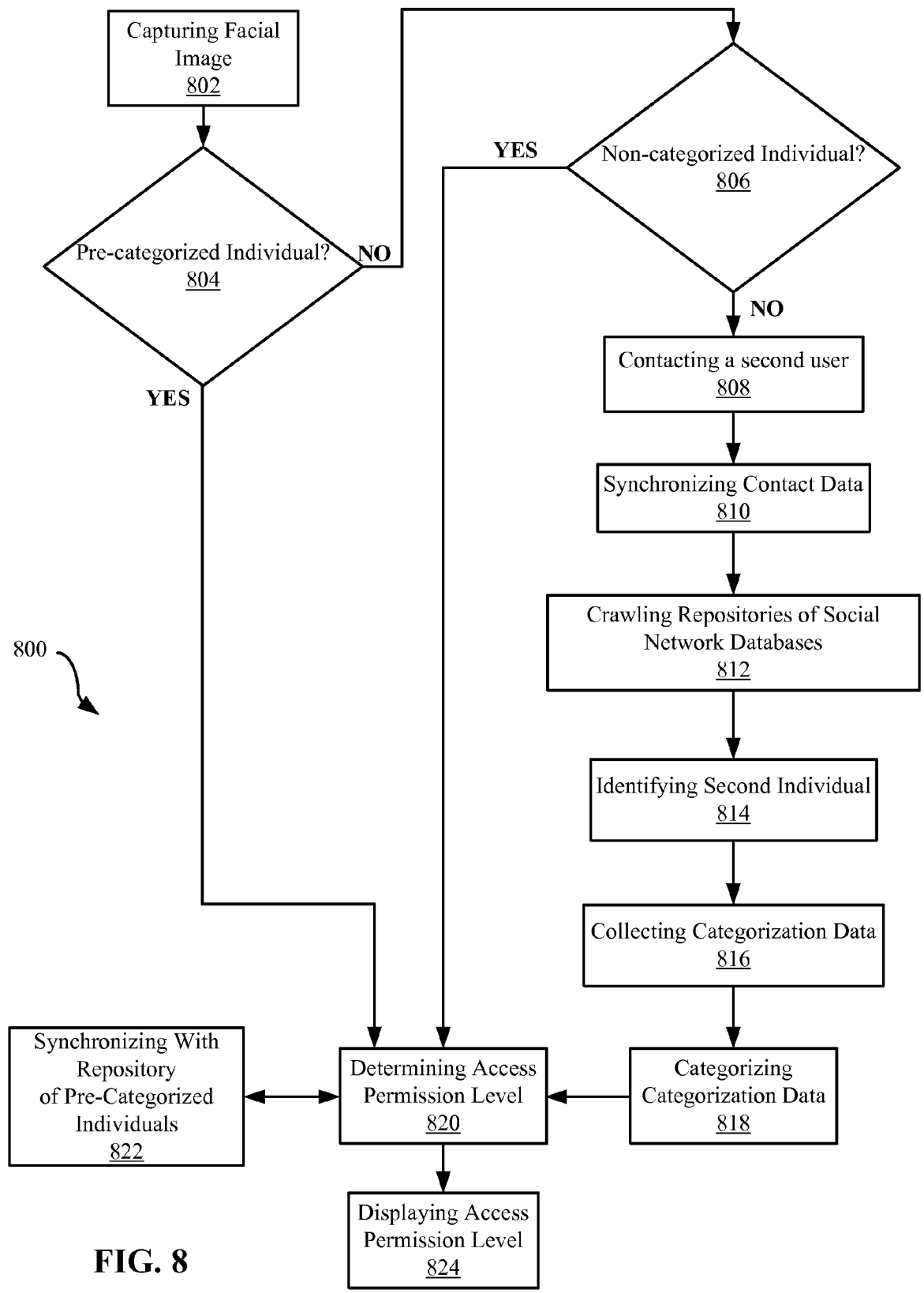
FIG. 8 is a process illustrating a method for utilizing repositories of social network databases for calculating an access permission level, according to embodiments.

FIG. 8 is a process illustrating a method for utilizing repositories of social network databases for calculating an access permission level, according to embodiments. The method 800 may begin at operation 802 by capturing the facial image of a visitor. Aspects of the present disclosure may be similar or the same as aspects described in FIG. 3 with respect to operation 302 and may be similar or the same as aspects described in FIG. 1 with respect to the monitoring device 122. The captured facial image of the visitor may be compared with facial images of pre-categorized individuals stored in a repository of pre-categorized individuals in operation 804. The repository of pre-categorized individuals may be a local (e.g., in the same physical location as the monitoring device) or virtual database. Operation 804 may be performed locally or may be performed through a shared pool of configurable network computing resources or a communication network. Aspects of the present disclosure may be similar or the same as aspects described in FIG. 3 with respect to operation 304.

If a facial image is found within the repository of pre-categorized individuals which, when compared with the facial image of the visitor, results in an image match score outside of an image match threshold, an access permission level may be determined for the visitor at operation 820 and the determined access permission level may be displayed to a user in operation 824. If a facial image is not found within the repository of pre-categorized individuals which, when compared with the facial image of the visitor, results in an image match score outside of an image match threshold, the method 800 may query a repository of non-categorized individuals in operation 806.

The repository of non-categorized individuals in operation 806 may include profiles of individuals previously collected from crawling the repositories of social network databases. In embodiments, the profiles stored in the repository of non-categorized individuals may have been previously sorted into one of three categories. In various embodiments, the profiles stored in the repository of non-categorized individuals may not have been categorized prior to a query from operation 804. Operation 806 may be performed locally or may be performed through a shared pool of configurable network computing resources or a communication network. In certain embodiments, the repository of pre-categorized individuals and the repository of non-categorized individuals may be the same repository. In further embodiments, operation 804 and operation 806 may both be performed within the same repository and may both be performed simultaneously.

If a facial image is found within the repository of non-categorized individuals which, when compared with the facial image of the visitor, results in an image match score outside of an image match threshold, an access permission level may be determined for the visitor at operation 820 and the determined access permission level may be displayed to a user in operation 824. If a facial is not found within the repository of non-categorized individuals which, when compared with the facial image of the visitor, results in an image match score outside of an image match threshold, a second user may be contacted in operation 808.

Contacting a second user in operation 808 may include sending the captured facial image of the visitor to the second user through a hand-held or similar communication device. A second user may be an individual who has previously registered to use the method 800. In certain embodiments, a second user may be an individual whose contact data is utilized in operation 810. In various embodiments, a second user may be an individual pre-determined by the user to contact when a captured facial image of a visitor goes unidentified after comparing the captured facial image with both the repository of pre-categorized individuals and the repository of the non-categorized individuals. For example, if the captured facial image of a visitor is unable to be recognized by the method 800, the captured facial image of the visitor may be sent to the mobile phone of the mother of the user using the method 800. In another example, if the captured facial image of a visitor is unable to be recognized by the method 800, the captured facial image of the visitor may be sent to the personal electronic mail belonging to a friend of the user. In certain embodiments, the second user may be able to perform certain actions in response to receiving the facial image of a visitor. For example, the second user may verify the visitor through their hand-held or similar communication device and may authorize the release of a computerized locking mechanism.

In response to contacting a second user in operation 808, the contact data of a user may be synchronized with a social data service in operation 810 (e.g., the social data module 108 from FIG. 1). Aspects of the present disclosure may be similar or the same as aspects described in FIG. 1 with respect to the contact module 100 and may be similar or the same as aspects described in FIG. 3 with respect to operation 310. In response to synchronizing the contact data of a user in operation 810, the method 800 may crawl the repositories of social network databases in operation 812. Aspects of the present disclosure may be similar or the same as aspects described in FIG. 1 with respect to the crawling module 112 and may be similar or the same as aspects described in FIG. 3 with respect to operation 308.

In embodiments, the method 800 may identify a second individual in operation 814 (e.g., a facial image which results in an image match score above an image match threshold) as a result of crawling the repositories of social network databases in operation 812. Aspects of the present disclosure may be similar or the same as aspects described in FIG. 3 with respect to operation 312. The method 800 may be constantly crawling the repositories of social network databases. In embodiments, the method 800 may constantly monitor the repositories of social network databases to check for discrepancies (e.g., updates) between data contained with the repositories of pre-categorized and non-categorized individuals and data contained within the repositories of social network databases. For example, if an individual whose profile is stored within the repository of pre-categorized individuals uploads several photos (e.g., image data) to the repository of a social network database, the method 800 may collect the image data (e.g., in operation 816), create additional facial data models for each of the photos (e.g., see Facial Model Module 114 description from FIG. 1), and update the profile of the individual with the additional facial data models.

In response to identifying a second individual in operation 814, categorization data for the second individual may be collected from the repositories of social network databases in operation 816. Aspects of the present disclosure may be similar or the same as aspects described in FIG. 3 with respect to operation 314. The method 800 may, in operation 818, group the categorization data collected in operation 816 with the facial image or images collected in operation 812 and used to identify the second individual in operation 814. Grouping the facial images of the second individual with the categorization data may include creating a profile for the second individual. Aspects of the present disclosure may be similar or the same as aspects described in FIG. 3 with respect to operation 316.

Utilizing information contained within the profile of the second individual, an access permission level for the second individual may be determined at operation 820. Aspects of the present disclosure may be similar or the same as aspects described in FIG. 1 with respect to the security policy module 120 and may be similar or the same as aspects described in FIG. 3 with respect to operation 318. Determining an access permission level at operation 820 may include synchronizing the determined access permission level results with the repository of pre-categorized individuals at operation 822. For example, if the method 800 is unable to identify a facial image stored in either the repository of pre-categorized individuals or the repository of non-categorized individuals but is able to identify a facial image of a second individual as a result of crawling the repositories of social network databases, the profile created for the second individual may be transmitted from the repository of non-categorized individuals to the repository of pre-categorized individuals to be used to in future comparisons.

In response to determining an access permission level in operation 820, the determined access permission level for the visitor (e.g., second individual) may be displayed to a user through a graphical user interface on a monitor. Aspects of the present disclosure may be similar or the same as aspects described in FIG. 3 with respect to operation 322.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for utilizing repositories of social network databases for calculating an access permission level for a first individual, comprising:

receiving a first facial image of the first individual captured through a monitoring device at a computerized locking mechanism;

comparing, in response to the receiving, the first facial image with facial images of pre-categorized individuals stored in a repository of pre-categorized individuals, wherein each pre-categorized individual is sorted into a category within a group of categories including at least a first category, a second category, and a third category;

comparing, in response to the first facial image being absent from the repository of pre-categorized individuals, the first facial image with facial images of non-categorized individuals stored in a repository of non-categorized individuals;

identifying, based on the comparing, a facial image of a second individual that has an image match score with the first facial image that is above an image match threshold;

collecting, in response to the identifying, categorization data associated with the second individual from the repositories of social network databases;

sorting, based on the collected categorization data, the second individual into one of the categories;

determining, based on the image match score of the second individual and category of the second individual, an access permission level for the first individual; and providing the access permission level to a first user;

wherein determining an access permission level includes accessing a security policy, wherein the security policy utilizes an identification value matrix to define access permission.

2. The method of claim 1, wherein comparing the first facial image with facial images of non-categorized individuals stored in a repository of non-categorized individuals further includes crawling, in response to the first facial image being absent from the repository of non-categorized individuals, the repositories of social network databases to collect facial images of non-categorized individuals.

3. The method of claim 1, wherein collecting categorization data includes accessing law enforcement databases and gathering information associated with image data.

4. The method of claim 1, wherein the access permission level includes a green indicator, a yellow indicator, and a red indicator.

5. The method of claim 1, wherein failing to locate a facial image includes comparing the first facial image of the first individual with the facial images in the first category, the second category, and the third category.

6. The method of claim 1, wherein the first category includes family members of the first user, the second category includes friends of family members of the first user, and the third category includes individuals unidentified relative to the first user.

7. The method of claim 1, wherein sorting the second individual includes implementing a geometric learning process to build a facial data model associated with the categorization data to be stored within the first category, the second category, or the third category.

8. The method of claim 1, wherein crawling repositories of social network databases includes accessing contact data provided by the first user.

9. The method of claim 1, wherein providing the access permission level further includes:

receiving, at the monitoring device, the access permission level for the first individual in conjunction with the categorization data used to determine the image match score for the facial image of the second individual; and displaying the permission level and the categorization data used to determine the image match score for the facial image of the second individual to the first user through a graphical user interface within the monitoring device.

10. The method of claim 1, further comprising unlocking the computerized locking mechanism in response to generating the access permission level.

11. The method of claim 1, further including in response to the first facial image being absent from both the repository of pre-categorized individuals and the repository of non-categorized individuals, contacting a second user to identify the first individual.

12. A computer program product for utilizing repositories of social network databases for calculating an access permission level for a first individual, the computer program product comprising a computer readable storage medium having program instructions embodied therewith, wherein the computer readable storage medium is not a transitory signal per se, the program instructions executable by a processor to cause the processor to perform a method comprising:

receiving a first facial image of the first individual captured through a monitoring device at a computerized locking mechanism;

comparing, in response to the receiving, the first facial image with facial images of pre-categorized individuals stored in a repository of pre-categorized individuals, wherein each pre-categorized individual is sorted into a category within a group of categories including at least a first category, a second category, and a third category;

comparing, in response to the first facial image being absent from the repository of pre-categorized individuals, the first facial image with facial images of non-categorized individuals stored in a repository of non-categorized individuals;

identifying, based on the comparing, a facial image of a second individual that has an image match score with the first facial image that is above an image match threshold;

collecting, in response to the identifying, categorization data associated with the second individual from the repositories of social network databases;

sorting, based on the collected categorization data, the second individual into one of the categories;

determining, based on the image match score of the second individual and category of the second individual, an access permission level for the first individual; and providing the access permission level to a first user;

wherein determining an access permission level includes accessing a security policy, wherein the security policy utilizes an identification value matrix to define access permission.

13. The computer program product of claim 12, wherein comparing the first facial image with facial images of non-categorized individuals stored in a repository of non-categorized individuals further includes crawling, in response to the first facial image being absent from the repository of non-categorized individuals, the repositories of social network databases to collect facial images of non-categorized individuals.

14. The computer program product of claim 12, wherein collecting categorization data includes accessing law enforcement databases and gathering information associated with image data.

15. A computer system for utilizing repositories of social network databases for calculating an access permission level for a first individual, the computer system comprising:

a memory; and a processor in communication with the memory, wherein the processor is configured to perform a method, the method comprising:

receiving a first facial image of the first individual captured through a monitoring device at a computerized locking mechanism;

comparing, in response to the receiving, the first facial image with facial images of pre-categorized individuals stored in a repository of pre-categorized individuals, wherein each pre-categorized individual is sorted into a category within a group of categories including at least a first category, a second category, and a third category;

comparing, in response to the first facial image being absent from the repository of pre-categorized individuals, the first facial image with facial images of non-categorized individuals stored in a repository of non-categorized individuals;

identifying, based on the comparing, a facial image of a second individual that has an image match score with the first facial image that is above an image match threshold;

collecting, in response to the identifying, categorization data associated with the second individual from the repositories of social network databases;

sorting, based on the collected categorization data, the second individual into one of the categories;

determining, based on the image match score of the second individual and category of the second individual, an access permission level for the first individual; and providing the access permission level to a first user;

wherein determining an access permission level includes accessing a security policy, wherein the security policy utilizes an identification value matrix to define access permission.

16. The computer system of claim 15, wherein comparing the first facial image with facial images of non-categorized individuals stored in a repository of non-categorized individuals further includes crawling, in response to the first facial image being absent from the repository of non-categorized individuals, the repositories of social network databases to collect facial images of non-categorized individuals.

17. The computer system of claim 15, wherein sorting the second individual includes implementing a geometric learning process to build a facial data model associated with the categorization data to be stored within the first category, the second category, or the third category.

18. The computer system of claim 15, wherein providing the access permission level further includes:

receiving, at the monitoring device, the access permission level for the first individual in conjunction with the categorization data used to determine the image match score for the facial image of the second individual; and displaying the permission level and the categorization data used to determine the image match score for the facial image of the second individual to the first user through a graphical user interface within the monitoring device.

* * * * *